UNITED STATES PATENT OFFICE.

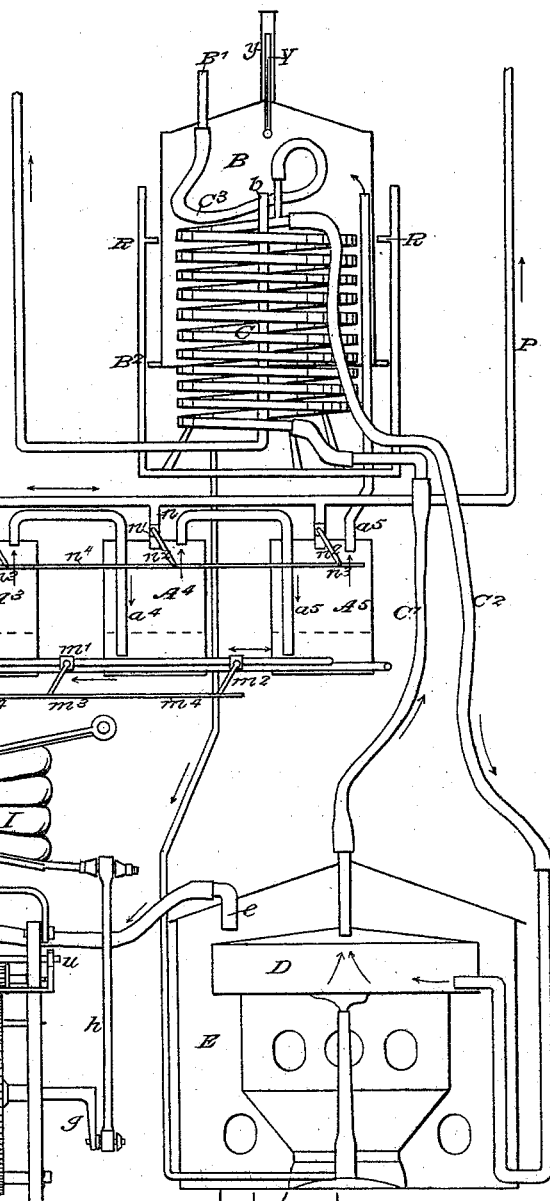
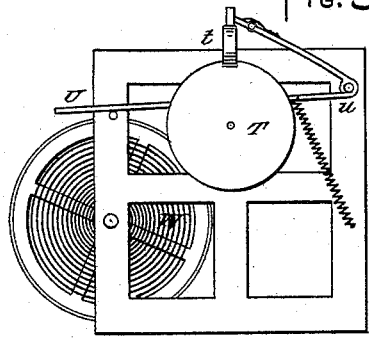
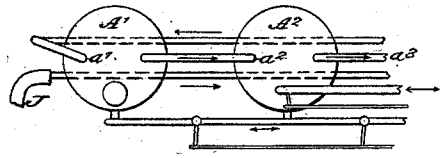
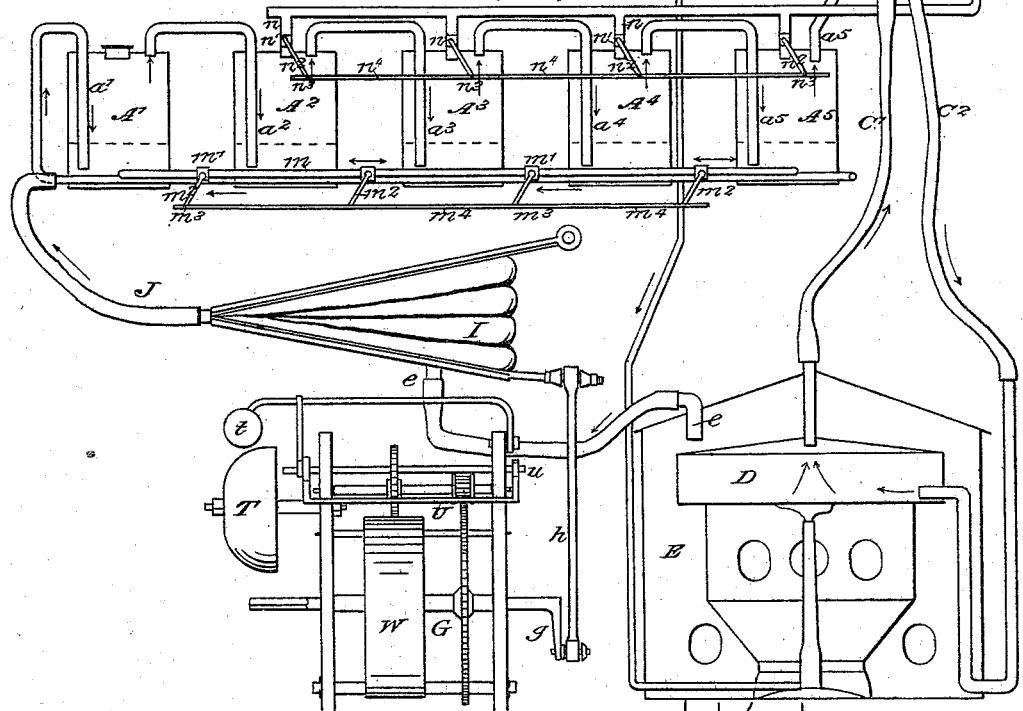
J. SAVAGE.
Vapor-Gas Apparatus.
No. 221,942. Patented Nov. 25, 1879.
Fig. 3.
Fig. 1.
Fig. 2.

JAMES SAVAGE, OF CANARSIE, NEW YORK.

IMPROVEMENT IN VAPOR-GAS APPARATUS.

Specification forming part of Letters Patent No. 221,942, dated November 25, 1879; application filed March 24, 1879.

*To all whom it may concern:*

Be it known that I, JAMES SAVAGE, of Canarsie, in the county of Kings and State of New York, have invented certain new and useful Improvements relating to Vapor-Gas Apparatus, of which the following is a specification.

I designate as "vapor-gas" the mixtures of atmospheric air with a vapor of volatile fluids, as naphtha, gasoline, or the like, suitable for burning through ordinary gas-burners, or other suitable burners, for the production of light or heat. My experiments have been mainly for the production of gas-light; but I propose to use one burner, using the same gas as a heat-producer to generate heat for use in the apparatus.

The device is intended more particularly for use in dwelling-houses, and will be so described; but I propose to make it of any size and to adapt it for manufactories or small towns, if desired.

The accompanying drawings form a part of this specification, and represent what I consider the best means of carrying out the invention.

Figure 1 represents the apparatus in side elevation. It should be explained that the parts in practice are more compacted together than is here shown. I have spread them out in order to more clearly show their relations. Figs. 2 and 3 represent parts only. Fig. 2 is a plan view of some of the evaporating-vessels. Fig. 3 is an elevation of the alarm.

Similar letters of reference indicate corresponding parts in all the figures.

$A'$ $A^2$ $A^3$, &c., are vessels partly filled with a volatile petroleum product, which I will term "gasoline." A pipe, $a'$, receiving air, as will be explained farther on, dives nearly to the bottom of the vessel $A'$ and discharges its air to bubble upward through the fluid. A corresponding pipe, $a^2$, leads this air over and dives nearly to the bottom of the vessel $A^2$. A corresponding pipe, $a^3$, connects this to $A^3$, and so on, each allowing the air to bubble up through the volatile fluid in the next vessel. At the end of the series the pipe $a^6$ leads the thoroughly-saturated air into a gas-holder, B, from whence it is conducted away through a pipe, $b$, to the burners. (Not represented.)

I have provided means for maintaining a just-sufficient degree of warmth in the gas to hold the vapor in proper condition.

Within the gasometer B is a coil, C, of iron or other suitable pipe, both ends of which lead out through the bottom and connect to pipes $C'$ $C^2$, which lead, respectively, to the top and bottom of what I may term a "boiler," D, although its temperature will never be required to be elevated to or near the boiling-point. This boiler D is kept warm by a fire. I propose in most domestic apparatus to use one or more Bunsen burners, using some of the same gas as the warming agent. This boiler should stand a little lower than the gasometer B, so that the warm water will by its levity flow upward through the pipe $C'$, circulate through the coil C, and descend through the pipe $C^2$, thus maintaining a constant circuit whenever the apparatus is in use, and insuring that the coil C, and consequently the gas in the gasometer, is kept properly warmed, however cold the weather.

To the highest point in the coil C, I connect a flexible pipe, $C^3$, the other end of which connects to a fixed pipe, $B'$, in the top of the gasometer. As the gasometer rises and falls the flexible pipe $C^3$ accommodates the motion. This forms a vent for any air which may accumulate in the water and tend to gather in the highest point of the coil. The fixed pipe $B'$ may be of glass, to better show the level of the water. As the water evaporates, or from whatever cause becomes gradually lessened, I supply more from time to time through the pipe $B'$. This arrangement provides a convenient means of filling the pipes, and insures that there shall never be either an excess of pressure in the pipes or a gathering of air therein.

E is a case of sheet metal or other suitable material which incloses the boiler D and its heating-flame. I esteem this desirable as an increased measure of safety, both against danger from fire and against the chance of the warming-flame being extinguished through any sudden opening of door or gust of wind which may accidentally be allowed to strike it. Another important function is to furnish a source from which air may be taken through any suitable impelling means to be passed through the evaporating-vessels A', &c. I take the air from the interior of the casing E at the top through a pipe, $e$.

Any suitable means may be employed to impel the air which is taken through the pipe $e$, and cause it to enter the first vessel, A', and be ultimately passed through all the series of vessels $A^2 A^3$, &c., and become saturated.

I have represented a clock-work, G, having a crank, $g$, a connecting-rod, $h$, and a bellows, I. The precise form of the apparatus or the character of the motive power is not essential, but I attach much importance to the following: The moderately warm air received through the pipe $e$ is, on being subjected to proper mechanical devices, conducted through the pipe J to the vicinity of the evaporating-vessels; then, instead of being passed immediately into the first vessel, A', and communicating nearly all its warmth thereto, it is passed through a pipe, $j$, leading through the bottom of each vessel $A' A^2$, &c., to the end of the series, and then passed back again. This distributes its warmth with almost absolute uniformity to the volatile fluid in the several vessels. On emerging from near the bottom of the vessel A' it is led upward, and is thus introduced into the pipe $a'$, above described.

The lower edge of the movable part B of the gasometer is turned outward, as indicated by $B^2$. The upper face of that lip or flange is coated with prepared felt, or some material adapted to make an approximately tight joint on being pressed up against a corresponding lip or flange projecting inward from the interior of the fixed tank which surrounds it, and which I have marked R.

Stops formed of abutting surfaces have long been used. In my construction, when the air-forcing means I is working actively, it will fill the gas-holder B, and bring these flanges $B^2$ and R tightly together. Then any excess of force will generate a still higher pressure in the gas-holder until the working mechanism is restrained by the increased resistance.

I can work ordinarily in this manner. Whenever the working force of the mechanism is exhausted and the gas-holder B commences to sink, the pressure of the gas at the burners will be lessened, and will attract attention to the fact that the motive power of the apparatus needs to be restored. The gasometer B should be of sufficient capacity, and supply gas at the reduced pressure for a sufficient time to allow the apparatus to be wound up, or the motive force to be otherwise re-enforced without depriving the house entirely of light.

As an additional safeguard I have attached an alarm having a hammer, $t$, striking on a bell, T, and operated by the lever U, turning on a center, $u$. A bent end of the lever U rests on the mainspring, W. So long as the latter remains properly wound up the alarm is silent; but when the spring W is too much unwound and is nearly losing its force it is expanded to such an extent that it lifts on the lever U and raises the hammer $t$. When this has proceeded sufficiently far the lever U slips off and thus releases the hammer $t$, and the blow is struck, calling attention at once to the necessity of winding up the spring. The hinge $u$ allows the lever U to again resume its place under the hammer-arm by the force of the spring shown so soon as the mainspring W is again contracted by winding it up.

I provide two connections between the several evaporating-vessels $A' A^2$, &c., in addition to those yet described. Near the bottom (and below the level to which the surface of the volatile fluid should ever be allowed to sink) is a connection-pipe, $m$, connecting each vessel with the next. It is controlled by stop-cocks $m'$, having levers $m^2$. The crank-pins $m^3$ on the ends of the several levers $m^2$ may be connected by a single rod, $m^4$, so that one operation by the attendant will open or close all the connections $m'$ at will.

At the top of the several vessels, or above the level to which the surface of the volatile fluid should ever be allowed to rise, is another set of connecting-pipes, $n$, which connect the tops of the vessels with each other, and also with a discharge-pipe, P, leading into a chimney or out through the roof, through which pipe any saturated air allowed to escape may be conveniently discharged without danger of fire or any offense to the senses. Each crank is controlled by a stop-cock, $n'$, having a lever, $n^2$, the crank-pins $n^3$ of which are connected by a rod, $n^4$. By operating this rod all the connections $n'$ may be opened or closed at will.

In preparing to fill the vessels both sets of cocks $m' n'$ are opened. Thus conditioned, the saturated air in the tops of the several vessels flows freely from one to another through the pipes $n$, and the volatile fluid in the bottoms of the several vessels can move freely through the pipes $m$ from one to another. Now, a screw-plug or other convenient device being opened in the top of one of the vessels, preferably A', the volatile fluid may be poured into that vessel, and will flow freely through the pipes $m$ into and correspondingly fill all the others. I propose to use such a number of the evaporating-vessels that the raising of the level of the fluid in each to only a small extent above the receiving ends of the several pipes $a' a^2$, &c., will maintain the apparatus in efficient working condition for a week or more.

When the filling is completed and the filling-orifice is again tightly stopped, all the cocks $m' n'$ are closed, and the apparatus is now in condition for use. It is important that a moderate temperature be maintained in the gasometer. The coil C is mounted at such a level that a portion is immersed in the water, and another and larger portion is above the water, and gives its warmth directly to the gas. A thermometer, Y, is mounted in the top of the gasometer, with its bulb within and the index part without, by the reading of which the temperature of the interior is exactly determined. Shields $y$, of several thicknesses of metal, interposed between the bulb and the top of the gasometer, prevent the heat from being conducted away by radiation in cold weather, and insure that the reading will give correctly the temperature of the gas.

Modifications may be made in the proportions and arrangement of the details within wide limits. I will use a gage of any ordinary or suitable character to indicate the level of the fluid in the several evaporating-vessels. I will use a thermometer having its bulb immersed in the gas and properly protected from radiating influences to indicate the degree of warmth of the gas at other points than in the gas-holder, if desired. I can use an apparatus making many blows, like the continuous alarm of a clock, in place of the device for striking a single blow when the spring is becoming exhausted.

I propose to attach an apparatus corresponding to a gas-holder, which may be made of sheet metal or any convenient material, (an inverted barrel or hogshead, if desired,) in which air may be accumulated by any convenient force acting at long intervals, to be used as required in my apparatus. Such would dispense with any continuous blowing mechanism as I have described; but in any form of the apparatus for impelling the air I propose to warm the air, and to lead it through or under the several evaporating-vessels to moderately and equally warm the whole before its introduction into the first one, as shown.

Any ordinary or suitable provisions may be made for stopping any of the pipes or passages beyond what I have shown, as also for emptying the entire apparatus or any part thereof when required.

I claim as my invention—

1. The combination, in an air-gas apparatus, with one or more evaporating-vessels, of an air-forcing apparatus, mechanism for automatically working said apparatus, and an alarm arranged to be operated by said mechanism, substantially as described.

2. The combination, with a number of separate evaporating-vessels and pipes connecting them with one another in a series, of a heater and an air-forcing mechanism connected with said heater and with one of the aforesaid evaporating-vessels by suitable pipes, and a gasometer connected with the evaporating-vessels, and provided with means for heating the saturated air stored therein, substantially as described.

3. The gas-holder B, provided with a continuous lip, $B^2$, having prepared felt or analogous packing, as described, in combination with the tank provided with a corresponding continuous lip, R, substantially as described, whereby when said lips are brought into contact with each other they form a tight joint, as set forth.

4. The pipes $C'$ $C^2$ and connected coil C, in combination with the gasometer B and water-heating device D, for warming the gas by circulating water from a warming-vessel or boiler through the entire contents of the gasometer and back again, as herein specified.

5. In combination with the gasometer B and warming-coil C, the pipe $B'$ and a flexible connection therefrom to the highest part of the coil, as and for the purposes herein specified.

6. In combination with the evaporating-vessels $A'$ $A^2$ and the pipes $a^2$ $a^3$, the connections $m$, connecting the bottom, the connections $n$, connecting the tops, and the controlling means $n'$, as shown, adapted to allow the several vessels to be put in free connection at the top and bottom, or entirely disconnected at will, as specified.

7. The combination, with a number of evaporating-vessels and pipes connecting them together in a series, of a heater, an air-forcing apparatus connected with said heater, and a pipe connected with the air-forcing apparatus and extending through the bottom of the series of evaporating-vessels, and opening into the first of said series, substantially as described.

In testimony whereof I have hereunto set my hand this 21st day of March, 1879, in the presence of two subscribing witnesses.

JAMES SAVAGE.

Witnesses:
CHARLES C. STETSON,
EDWARD D. STAFFORD.